US006929769B2

(12) United States Patent
Parg et al.

(10) Patent No.: US 6,929,769 B2
(45) Date of Patent: Aug. 16, 2005

(54) NITRILE RUBBER MIXTURES WITH A LOW TENDENCY TOWARDS MOLD CONTAMINATION

(75) Inventors: Roland Parg, Leverkusen (DE); Hans Magg, Kürten (DE); Luigi Marinelli, Leverkusen (DE); Jürgen Wassen, Leverkusen (DE); Peter Wendling, Leverkusen (DE); Hans-Rafael Winkelbach, Brights Grove (CA); Christiane Oppenheimer-Stix, Neuss (DE); Hans Christian Strauch, Dormagen (DE); Jean-Pierre Lambert, Strassbourg (FR)

(73) Assignee: Bayer Aktiengesellschaft, Leverkusen (DE)

( * ) Notice: Subject to any disclaimer, the term of this patent is extended or adjusted under 35 U.S.C. 154(b) by 138 days.

(21) Appl. No.: 10/345,722

(22) Filed: Jan. 16, 2003

(65) Prior Publication Data

US 2003/0181604 A1 Sep. 25, 2003

(30) Foreign Application Priority Data

Jan. 23, 2002 (DE) ........................................ 102 02 370

(51) Int. Cl.$^7$ ................................................ H05B 6/00
(52) U.S. Cl. ...................................... 264/478; 264/675
(58) Field of Search .............................. 525/329.1, 238; 524/300; 264/478, 645

(56) References Cited

U.S. PATENT DOCUMENTS

| 3,700,637 A | 10/1972 | Finch, Jr. .................... 260/83.3 |
| 4,228,119 A | 10/1980 | Gomez et al. .............. 264/211 |
| 4,337,329 A | 6/1982 | Kubo et al. ................. 525/339 |
| 4,384,081 A | 5/1983 | Kubo et al. ................. 525/339 |
| 4,452,951 A | 6/1984 | Kubo et al. ................. 525/339 |
| 4,464,515 A | 8/1984 | Rempel et al. ............. 525/338 |
| 4,503,196 A | 3/1985 | Rempel et al. ............. 525/338 |
| 4,581,417 A | 4/1986 | Buding et al. .............. 525/338 |
| 5,683,819 A | * 11/1997 | Mori et al. ................. 428/500 |
| 5,919,864 A | * 7/1999 | Watanabe et al. ........... 525/166 |

FOREIGN PATENT DOCUMENTS

| BE | 867742 | 10/1978 |
| GB | 1 558 491 | 1/1980 |

OTHER PUBLICATIONS

Handbuch fur die Gummundustrie of Bayer AG, (month unavailable) 1992, p. 535, "D12.2 Vulkasil".

* cited by examiner

Primary Examiner—Randy Gulakowski
Assistant Examiner—Christopher Keehan
(74) Attorney, Agent, or Firm—Jennifer R. Seng

(57) ABSTRACT

The present invention relates to a process for reducing mold contamination in an injection molding process by using a mixture of nitrile rubbers, in the range of from 0.1–0.5 wt. % of fatty acids and optionally further additives.

7 Claims, 3 Drawing Sheets

Figure 1:
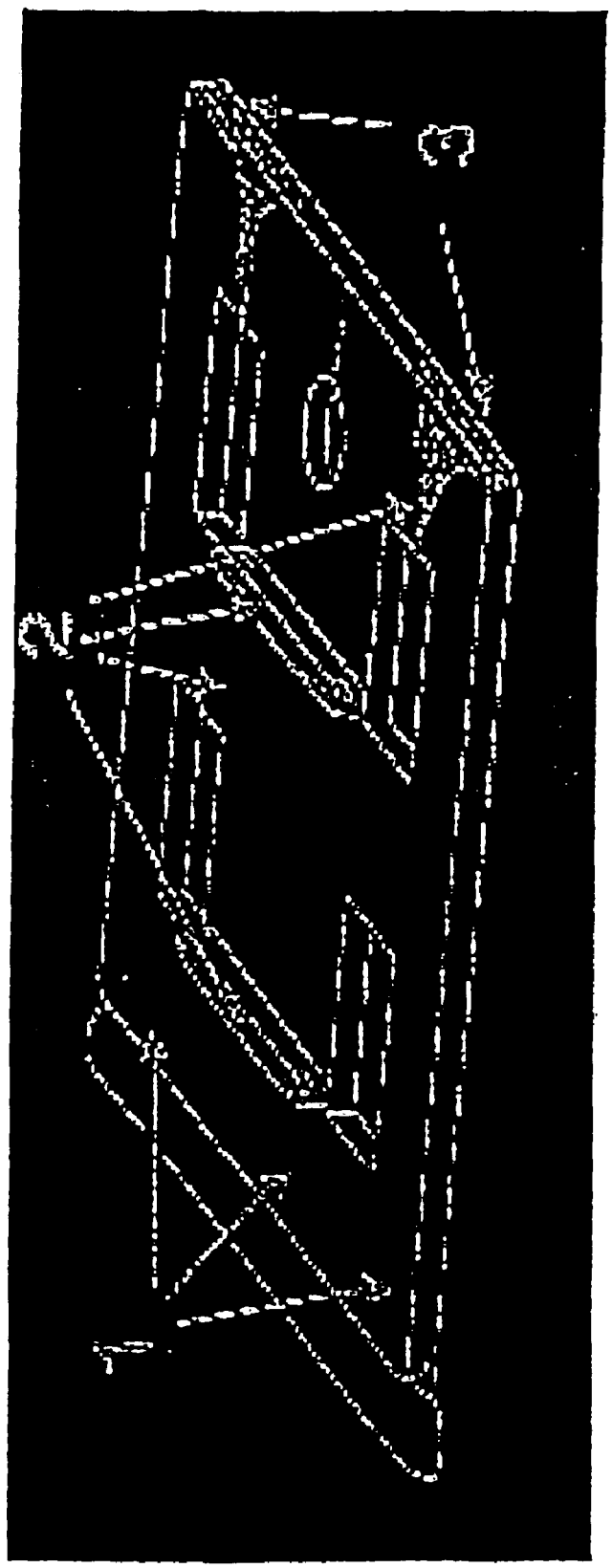

Runner = 3, Material flow line = 1,2

Mixture A8 after 80 cycles, minimal mould contamination

Mixture A1 – A10 apart from A8 after 80 cycles: No mould contamination

High mould contamination with Zetpol 2000 L

Mixture B12, 13, 15, 18 after 80 cycles, extreme mould contamination

Mixture B11, 14, 16 – 19 after 80 cycles, severe mould contamination

NITRILE RUBBER MIXTURES WITH A LOW TENDENCY TOWARDS MOLD CONTAMINATION

FIELD OF THE INVENTION

The present invention relates to a process for reducing mold contamination in an injection molding process by using a mixture of nitrile rubbers, in the range of 0.1–0.5 wt. % of fatty acids and optionally further additives.

BACKGROUND OF THE INVENTION

Shaped articles are predominantly produced by an injection molding process. In the injection molding process a visco-elastic mixture is forced into a mold, heated, optionally under pressure, and then removed from the mold.

In the injection molding cycle, a rubber mixture passes through a pressure profile up to filling of the mold.

During the injection phase, in the region of the capillaries, a high pressure is rapidly built up and the rubber mixture is subjected to a high shear gradient. At the injection nozzle there is a marked release of pressure with the risk that low molecular weight constituents of the rubber mixture can cause "flash vaporization". During the of filling of the mold the pressure rises again slightly until filling of the mold is complete, it is to be assumed that additives which are concentrated on the surface of the mixing front via demixing processes are no longer taken up by the mixture and can thus cause surface defects up to a lack of welding of the mixture.

The thermodynamic explanation for this is based on a shear field, under the influence of which an entropy gradient develops in the polymer which generates a diffusion flow from the outside to the center of the flow, leading to concentration of low molecular weight constituents on the outer layer of the flow.

Chemicals, which as a result of this process moreover reduce the friction of the rubber mixture on a capillary wall (i.e. cause wall slippage) are conventional processing active compounds such as, are widely employed in the rubber industry.

In order to achieve the highest possible production cycle, the mold, as a rule a metal mold, should not be contaminated by residues of the rubber mixture. If the finished shaped articles can be removed from the mold only with a layer being left behind, mold contamination is referred to. Even small residual amounts add up after several cycles to layers, which can no longer be tolerated.

So-called mold release aids are therefore often added to the rubber mixtures. However, these can in their turn again lead to undesirable deposits.

SUMMARY OF THE INVENTION

It has now been found that a nitrile rubber-containing rubber mixture which contains in the range of from 0.1–0.5 wt. % of fatty has the effect of a low mold contamination in the injection molding process, with similarly good mold release properties. It has also been found that a nitrile rubber-containing rubber mixture, which contains in the range of from 0.1–0.5 wt. % of fatty acids, has a short carbon black mixing-in time.

The present invention provides a process for reducing mold contamination in the injection molding process by nitrile rubber, wherein a mixture containing one or more nitrile rubbers and in the range of from 0.1–0.5 wt. % of fatty acids and optionally further additives and/or fillers is employed.

BRIEF DESCRIPTION OF THE INVENTION

Figure 2:
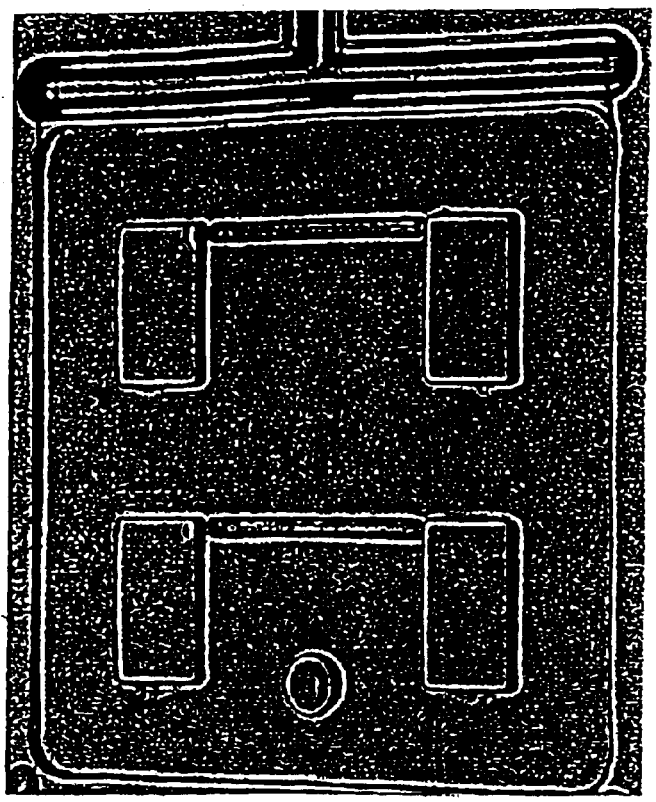
Figure 2:
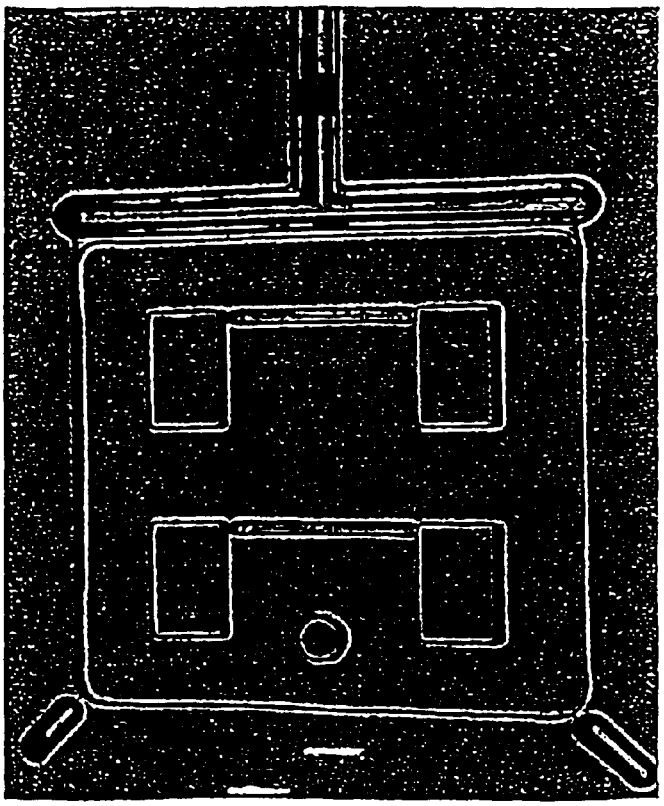
Figure 3:
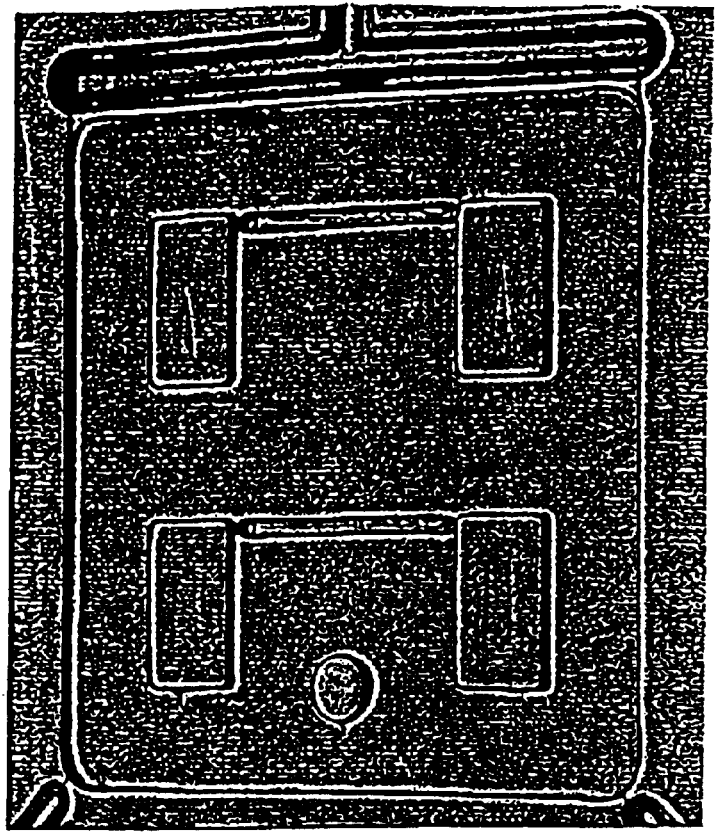
Figure 3:
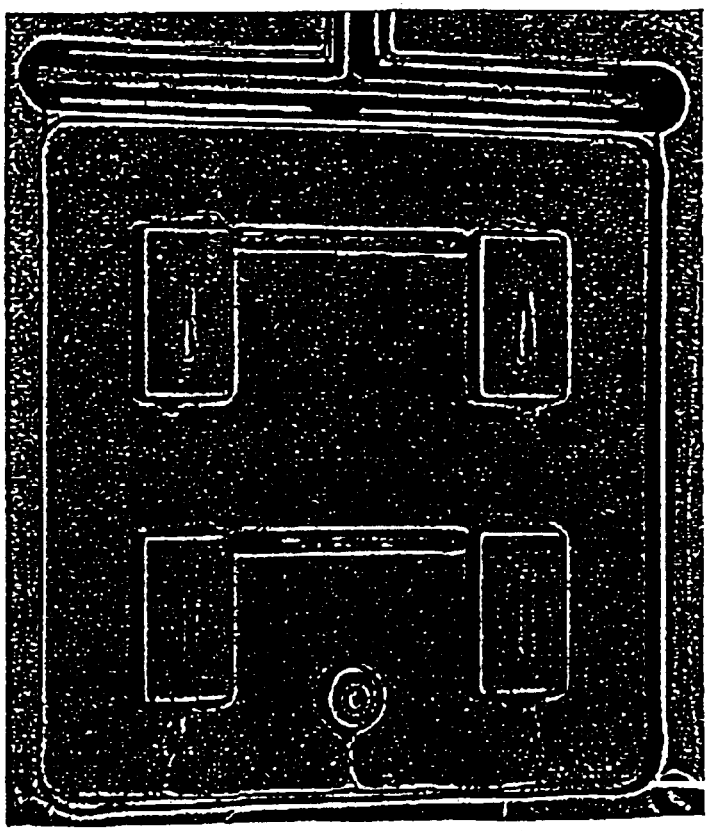

FIG. 1 illustrates the geometry of a mold.
FIG. 2 illustrates the molds from Example 5
FIG. 3 illustrates the molds from example 6. .

DETAILED DESCRIPTION OF THE INVENTION

Nitrile rubbers are understood as meaning diene/(meth) acrylonitrile copolymers. Isoprene and butadiene are preferred dienes. The copolymers have a content of copolymerized acrylonitrile and/or methacrylonitrile units of 5 to 60, preferably 10 to 50 wt. %.

Hydrogenated nitrile rubbers are furthermore expressly included under the term. "Hydrogenated nitrile rubber" or "HNBR" in the context of the present invention is to be understood as meaning nitrile rubbers in which the C=C double bonds are partly or completely hydrogenated selectively (i.e. without hydrogenation of the C≡N triple bond). Preferred hydrogenated nitrile rubbers are those with a degree of hydrogenation, based on the C=C double bond originating from butadiene, of at least 75, preferably at least 95, more preferably at least 98%. The degree of hydrogenation can be determined by NMR and IR spectroscopy.

The hydrogenation of nitrile rubber is known from U.S. Pat. No. 3,700,637, DE-A-2 539 132, DE-A-3 046 008, DE-A-3 046 251, DE-A-3 227 650, DE-A-3 329 974, EP-A-111 412 and FR-B-2 540 503, the documents mentioned herewith being included as reference in the present Application for the purposes of US patents practice. Hydrogenated nitrile rubber is distinguished by a high tear strength, low abrasion, low permanent deformation after exposure to pressure and tensile stress and good resistance to oil, but above all by a remarkable stability towards thermal and oxidative influences. Hydrogenated nitrile rubbers are therefore preferred in the context of the present invention.

Suitable nitrile rubbers have Mooney viscosities (DIN 53 523, ML 1+4) of 25 to 100 MU, preferably 40 to 80 MU.

Fatty acids are understood by those skilled in the art to mean organic acids with in the range of 8–24 carbon atoms. In the context of the present invention, straight-chain fatty acids having in the range from 12 to 18 carbon atoms are preferred, more preferred are fatty acids having 14 and 18 carbon atoms or mixtures of these two. Straight-chain fatty acids are fatty acids with an even number of carbon atoms.

Possible further additives include, for example, vulcanization activators known to those skilled in the are, preferably metal oxides, such as zinc oxide or magnesium oxide, anti-aging agents, such as alkyl-substituted diphenylamines, mercaptobenzimidazoles, unsaturated ethers, such as Vulkazon® AFD (Bayer AG) or cyclic, unsaturated acetals, such as Vulkazon® AFS/LG (Bayer AG). Additives, which are furthermore mentioned, include:

plasticizers, preferably carboxylic acid esters, such as sebacic acid and derivatives thereof or trimellitic acid and derivatives thereof processing auxiliaries, preferably stearic acid and derivatives thereof, such as zinc stearate, or polymers, such as poly-ethylene/vinyl acetate (Levapren® from Bayer AG) or poly-ethylene/vinyl acrylate (VAMAC® from DuPont).

It may furthermore be advantageous to introduce fillers into the rubber mixture according to the present invention. These can be non-reinforcing or reinforcing.

Examples of fillers, which may be mentioned, include:
- carbon black, such as MT, GPF, SRF and above all FEF carbon black,
- metal oxides, such as titanium dioxide (above all as a white pigment)
- silicates, such as sodium aluminum silicate
- silicas, preferably precipitated silicas
  in order to improve the abrasion, so-called active fillers according to the proposed ISO 5794, appendix D-part 1, e.g. published e.g. on p. 535 of the "Handbuch fur die Gummiindustrie" of Bayer AG, 1992, Leverkusen, are preferably suitable
- clays, mica, talc.

In addition, it may be advantageous to employ additional activators for improving the adhesion between filler and rubber, such as e.g. silanes, such as Ucarsil® RC-1 (Union Carbide). Pigments can furthermore be added.

The amounts of the individual components of the mixture depend on the intended use of the mixture and can be determined by a few preliminary experiments.

The substances are generally employed in the following amounts (in each case in phr=per hundred parts of rubber):
- anti-aging agents in the range from 0 to 4 phr,
- retardants in the range from 0 to 2 phr,
- metal oxides, such as ZnO, in the range from 0 to 30 phr,
- fillers in the range from 0 to 150 phr, preferably active fillers,
- plasticizers in the range from 0 to 20 phr,
- processing auxiliaries in the range from 0 to 2 phr.

The present invention also relates to a process for improving the ease of mixing carbon black into nitrile rubber mixtures, wherein a mixture containing one or more nitrile rubbers and in the range of 0.1–0.5 wt. % of fatty acids and optionally further additives and/or fillers is employed.

To prepare crosslinkable mixtures from the mixtures according to the present invention, crosslinking agents are added to the rubber mixtures. Suitable crosslinking agents include peroxide systems, sulfur and/or sulfur donor systems.

Preferred peroxide systems include dialkyl peroxides, ketal peroxides, aralkyl peroxides, peroxide ethers, peroxide esters, such as e.g. di-tert-butyl peroxide, bis-(tert-butylperoxyisopropyl)-benzene, dicumyl peroxide, 2,5-dimethyl-2,5-di(tert-butylperoxy)-hexane, 2,5-dimethyl-2,5-di(tert-butylperoxy)-hex-3-ene, 1,1,-bis-(tert-butylperoxy)-3,3,5-trimethyl cyclohexane, benzyl peroxide, tert-butyl cumyl peroxide and tert-butyl perbenzoate.

The amounts of peroxide are in the range from 1 to 10 phr, preferably in the range from 4 to 8 phr, based on the rubber. The crosslinking can be carried out at temperatures from 100 to 200° C., preferably 130 to 180° C., optionally under a pressure from 10 to 200 bar. After the crosslinking, the vulcanization products can be conditioned by storage at elevated temperature.

The peroxides can advantageously also be employed in polymer-bonded form. Corresponding systems are commercially available, such as, for example, Polydispersion T(VC) D-40 P (polymer-bonded di-tert-butylperoxy-isopropylbenzene) from Rhein Chemie Rheinau GmbH.

Further suitable crosslinking agents include sulfur or sulfur donors and combinations of these components.

Sulfur can be employed as soluble or insoluble sulfur, as a blend thereof (pulverulent, coated) or in another suitable form, e.g. as a premixed mixture of sulfur and rubber—"sulfur-batch". The amount is in the range from 0.1 to 5 phr, preferably 0.1 to 1.5 phr.

Possible sulfur donors include derivatives of thiuram, preferably tetramethylthiuram disulfide, tetraethylthiuram disulfide, tetrabutylthiuram disulfide and tetrabenzylthiuram disulfide. These can in turn be used in combination with other sulfur-containing components, for example dithiomorpholide, dithiocaprolactam or other compounds with a di-, tri-, tetra- or poly-sulfide structure.

The amount of the thiuram derivatives is conventionally in the range from 0.5 to 5 phr, preferably 1 to 2.5 phr. The amount of the supplementary sulfur-containing components can be chosen in the range from 0.1 to 3 phr, preferably 0.5 to 1.5 phr.

Sulfur crosslinking systems can also contain accelerators. Preferred possible accelerators are those of the mercapto-benzothiazole or mercapto-benzothiazyl disulfide type in amounts in the range from 0.5 to 3 phr, preferably 0.5 to 1.5 phr, or so-called sulfenamides, such as, for example, cyclohexyl-benzo-thiazyl sulfenamide (CBS), tert-butyl-benzothiazylsulfenamide (TBBS), morpholine-benzothiazylsulfenamide (MBS) and dibenzylbenzothiazyl-sulfenamide (DCBS), these conventionally being employed in amounts in the range from 0.5 to 3, preferably 0.5 to 1.5 phr.

It can furthermore be advantageous to employ the following additives:
- zinc salts of dithiocarbamic acids in amounts in the range from 0.5 to 1.5 phr.
- derivatives of dithiophosphoric acid, guanidines and other conventional aminic accelerators in the rubber industry.
- retardants, such as phthalic acid, phthalic anhydride, benzoic acid or salicylic acid or other organic acids, such as N-nitroso compounds, or such as N-cyclohexylthiophthalimide or other sulfonamide derivatives, such as Vulcalent E/C available from Bayer AG.

The crosslinking can also be achieved by high-energy radiation.

Crosslinking in the context of the invention means that during extraction for 10 hours in a Soxhlet attachment with toluene as the extracting agent, less than 10, preferably less than 5 wt. %, based on the rubber, can be extracted.

The optimum amount of crosslinking agent can easily be determined by preliminary experiments. It is known here that the amount of peroxide needed is indirectly proportional to the residual double bond content of the rubber.

Any mixing unit for rubbers known to those skilled in the art, such as kneaders, mills and extruders, can be used as the mixing unit.

It is to be understood that the rubber is not degraded during the mixing operation. It may be advantageous to carry out cooling during the mixing operation. To avoid scorch, the crosslinking agent is often added as the last component, optionally in a separate mixing operation.

The most diverse shaped articles can be produced in an advantageous manner by the process according to the present invention.

Shaped articles according to the present invention which are employed above all in the car industry are found in the following fields of use:
- Drive belts, toothed belts, polymeric belts
- Seals/membranes, O-rings, slot rings in various forms
- Fuel-carrying components)
- Air-carrying components) Hoses
- Oil-carrying components)
- Water-carrying components)
- Heating/air conditioning/ventilation Electrical installations, cable sheathings Spark plugs Packings/dust caps Clutch disc linings Valve caps Soundproofing Fans, fan casings and tension pulleys The polymeric material according to the present invention with a low fatty acid content is useful in multi-layer systems that make use of adhesion promoters or direct rubber-substrate adhesion.

It is known by those skilled in the art to tailor-make the mixtures according to the present invention and their properties by the addition of further polymers, such as BR, NR, IIR, IR, EPDM, EPM, CR, SBR, AEM, ACM or fluorine polymers.

The following examples serve to illustrate the invention without intending to limit it.

EXAMPLES

Starting Substances

Therban® A 3406 is an HNBR with an acrylonitrile content of 34%, a Mooney value of 68 MU and a residual double bond content of not more than 0.9% available from Bayer AG. Therbane A3406 has a fatty acid content of 0.17 wt. % (for the measurement specification, see Sample preparation, Determination of the total fatty acid).

Therban® A 3467 is an HNBR with an acrylonitrile content of 34%, a Mooney value of 68 MU and a residual double bond content of 5.5% available from Bayer AG. Therban® A 3467 has a fatty acid content of 0.14 wt. % (for the measurement specification see Sample preparation, Determination of the total fatty acid).

Zetpol® 2000 L is an HNBR with an acrylonitrile content of 36%, a Mooney value of 65 MU and a residual double bond content of 0.5% available from Nippon Zeon, JP. Zetpol® 2000 L has a fatty acid content of 0.56 wt. % (for the measurement specification see Sample preparation, Determination of the total fatty acid).

Zetpol® 2020 is an HNBR with an acrylonitrile content of 36%, a Mooney value of 78 MU and a residual double bond content of 7 to 8% available from Nippon Zeon, JP. Zetpol® 2020 has a fatty acid content of 0.79 wt. % (for the measurement specification see Sample preparation, Determination of the total fatty acid).

Nitrile rubber (NBR) A with 34% and a Mooney viscosity of 30 MU and a fatty acid content of 0.13% (for the measurement specification see Sample preparation, Determination of the total fatty acid). Nitrile rubber (NBR) NBR B with 34% and a Mooney viscosity of 30 MU and a fatty acid content of 1.87% (for the measurement specification see Sample preparation, Determination of the total fatty acid).

Nitrile rubber (NBR) NBR C with 34% and a Mooney viscosity of 80 MU and a fatty acid content of 0.09% (for the measurement specification see Sample preparation, Determination of the total fatty acid).

Nitrile rubber (NBR) NBR D with 34% and a Mooney viscosity of 80 MU and a fatty acid content of 2.01% (for the measurement specification see Sample preparation, Determination of the total fatty acid).

Additional components include:

| Tradename | Supplier | Chemical Name |
|---|---|---|
| Carbon black Corax ® N 550 | Degussa AG | |
| Carbon black Regal ® SRF N 772 | Cabot GmbH | |
| Zinc white RS | Zinkweiβ ForschungsgmbH | |
| Zinc oxide, active | Bayer AG | |
| Stearic acid | Henkel KGaA | |
| Diplast 8–10 | Lenza Spa | trimellitic acid ester $C_8$-$C_{10}$-alkyl |
| Vulkanol ® OT | Bayer AG | |
| Naugard ® 445 | Uniroyal | 4,4'-bis(1,1-dimethyl-benzyl)diphenylamine |
| Vulkanox ® ZMB2 | Bayer AG | derivative of zinc mercaptobenzothiazoles |
| Vulkanox ® MB2 | Bayer AG | derivative of mercaptobenzothiazoles |
| Vulkacit ® NZ/EG | Bayer AG | |
| Vulkacit ® Thiuram C | Bayer AG | |
| Vulkalent ® EC | Bayer AG | |
| Rhenocure ® IS 60/G75 | Rhein Chemie Reinau GmbH | |
| Perkadox ® 14/40B | AKZO | 1,3(1,4)bis(2-tertiary butyl-peroxyisopropyl)benzene |
| Maglite DE | | magnesium oxide |
| Polydispersion T (VC) D-40 P | Rhein Chemie Rheinau GmbH | di(t-butyl-peroxyisopropyl)-benzene, polymer-bonded |
| Vulkanox ® BHT | Bayer AG | phenolic antioxidant |
| Vulkanox ® BKF | Bayer AG | polynuclear phenolic antioxidant |
| Rhenofit ® TRIM/S | Rhein Chemie Rheinau GmbH | trimethylolpropane trimethacrylate 70%/bonded to 30% silica |

Measurement Methods

| Value | Dimension | Properties | Test standard |
|---|---|---|---|
| ML-1+4/100° C. | MU | Mooney viscosity | DIN 53523 Part 3 |
| MS-T5/120° C. and 140° C. | Min | Initial vulcanization properties according to Mooney (time for 5 MU above minimum) | DIN 53523 Part 4 DIN 53529 Part 3 |
| MDR rheometer Minimum and maximum and MAX–min | S'dNM min | Course of vulcanization Torque minimum-maximum and max./min. difference | |
| T10, T50, T80, T90 | | Time for 10%, 50%, 80%, 90% conversion | |
| S | MPa | Tensile strength | DIN 53504 |
| E | % | Elongation at break | DIN 53504 |
| Mxxx | MPa | Modulus at xxx % elongation | DIN 53504 |
| H | Shore A/D | | DIN 53505 |
| RE | % | Hardness | DIN 53512 |
| Abrasion | cm³ | Rebound elasticity | DIN 53516 |
| CS | % | Abrasion Compression set | DIN 53517 |
| HL aging | | Aging in hot air | Test specimen II |
| Delta S, Delta E, Delta H | % or Shore A/D | Change in tensile strength, elongation at break, hardness | DIN 53508 |
| Fatty acid content GC method | wt. % | | |
| Apparatus: | | Agilent 6890 with FID | |
| Capillary column: | | Permabond FFAP-DF-0.25 m*0.32 mm ID | |

-continued

| Value | Dimension Properties | Test standard |
|---|---|---|
| Temperatures: | | |
| Injector: | 240° C. | |
| Detector: | 240° C. | |
| Oven: | 220° C., isothermal | |

Sample Preparation

Determination of the Total Fatty Acid 4 to 5 g (accurate to 0.01 g) of the mixture to be analyzed are dissolved in 20 ml toluene and 20 ml THF. 100 µl $H_3PO_4$ and 5 ml standard solution are added to the solution. After a reaction time of 1.5 h, the solution is precipitated with 60 ml methanol. If appropriate, 20 ml of the extract solution are dried under nitrogen and 2 ml methanol is added. The solution is removed from the polymer by transfer into a new sample bottle and drying is carried out again under nitrogen. 500 µl, 1,000 µl or 2,000 µl toluene is added to the residue, depending on the concentration.

Examples 1 to 4

The mixtures listed in Table 1 were prepared, the recipe constituents in each case being stated per 100 parts of rubber.

TABLE 1

| Starting substances | Example 1 | Example 2 | Example 3 | Example 4 |
|---|---|---|---|---|
| Therban ® A3406 | 100 | | | |
| Therban ® A3467 | | 100 | | |
| Zetpol ® 2000L | | | 100 | |
| Zetpol ® 2020 | | | | 100 |
| Carbon black Corax N 550 | 50 | 50 | 50 | 50 |
| Zinc white RS | 5 | 5 | 5 | 5 |
| Diplast ® 8–10 | 5 | 5 | 5 | 5 |
| Naugard ® 445 | 1.5 | 1.5 | 1.5 | 1.5 |
| Vulkanox ® ZMB2 | 1 | 1 | 1 | 1 |
| Perkadox ® 14/40 B-GR | 8 | 8 | 8 | 8 |

The mixtures were prepared in a laboratory kneader GK 1,5 E (Krupp Elastomertechnik, Hamburg), cooling water temperature 50° C., blade speed 50 RPM, plunger pressure 6 bar, kneader filling level 70 to 80%, based on the chamber volume of the kneader.

Mixing sequence: Initially introduce the rubber, add the remaining constituents after a running time of 1 min, emptying of the kneader at a batch temperature of >125° C. The peroxide was subsequently mixed in on a roll mill (Krupp Elastomertechnik) at a cooling water temperature of 40° C.

The sheets for the determination of the mechanical properties were crosslinked/vulcanized in a vulcanizing press (Krupp Elastomertechnik) at 180° C. to t 90+5 minutes.

Table 2 shows the energy uptake during the mixing and the so-called BIT (black incorporation time), which can be interpreted as the time for mixing in the carbon black. The BIT is defined as the difference in time between the maxim of the conductivity to the maxim of the energy uptake of the mixture.

TABLE 2

| Example | Carbon black dispersion* | Energy uptake** | BIT*** |
|---|---|---|---|
| 1 | 98% | 15.3 | 44 |
| 2 | 98% | 15.4 | 48 |
| 3 | 98% | 15.8 | 56 |
| 4 | 98% | 15.8 | 56 |

*determined visually on shiny sections by the incident light method at 150-fold magnification
**maximum energy uptake in KW
***in sec.

The significant shortening of the mixing-in time and the lower energy uptake of the HNBR samples of lower fatty acid content is evident from Table 2. This advantageous shortening has no influence on the profile of properties of the vulcanization products produced from the mixtures, since an identical carbon black dispersion of the mixture is achieved. This is shown in Table 3. The results of the physical tests are shown in Table 3.

TABLE 3

| | Example 1 | Example 2 | Example 3 | Example 4 |
|---|---|---|---|---|
| S in MPa | 27.8 | 26.8 | 25.7 | 28.1 |
| E in % | 374 | 298 | 409 | 305 |
| M 100 in MPa | 4.0 | 5.5 | 4.3 | 5.5 |
| M 200 in MPa | 13.2 | 17.0 | 12.2 | 17.7 |
| M 300 in MPa | 22.5 | 27.1 | 20.2 | 27.5 |
| H 23° C. as Shore A | 70 | 73 | 72 | 74 |
| RE in % | 66.5 | 70.5 | 65.8 | 71.2 |
| Tear propagation resistance in N/mm | 17.5 | 13.7 | 21.9 | 13.5 |

Examples 5 to 6

The following mixtures were prepared (parts are stated in each case).

| Starting substance | Example 5 | Example 6 |
|---|---|---|
| Therban ® A3406 | 100 | |
| Zetpol ® 2000L | | 100 |
| Zinc oxide, active | 2 | 2 |
| Maglite DE | 2 | 2 |
| Naugard ® 445 | 1.1 | 1.1 |
| Vulkanoz ® ZMB2 | 0.4 | 0.4 |
| Carbon black N550 | 50 | 50 |

These mixtures were prepared analogously to Example 1 in a laboratory kneader GK 90 E (also Krupp Elastomertechnik). In each case the following substances were added analogously to Example 1 on the mill described there (phr=parts per 100 parts of rubber).

To investigate the influences of various additives on the mold contamination properties, both the type of additives and the dosage amount were varied. The precise dosage variants were given by the JNP random experiment planning. These 20 variations were as follows:

Injection Molding Results DESMA:

underlined=none, bold print=severe-extreme mold contamination

| Polymer A = 3406 Polymer B = 2000L | AO | Dosage of AO | Co-catalyst | Salt | Salt level | AO/co-agent |
|---|---|---|---|---|---|---|
| A1 | Vulkanox ®KB | 0.1 | Present | Stearic | 0.5 | HVA2 |
| A2 | Vulkanox ®KB | 0.1 | Present | Stearic | 1.5 | DDA70 |
| A3 | Vulkanox ®KB | 0.2 | Present | Palmitic | 1 | DDA70 |
| A4 | Vulkanox ®KB | 0.2 | Absent | Stearic | 0.5 | HVA2 |
| A5 | Vulkanox ®KB | 0.5 | Absent | Palmitic | 1.5 | HVA2 |
| A6 | Vulkanox ®BKF | 0.1 | Absent | Palmitic | 1 | HVA2 |
| A7 | Vulkanox ®BKF | 0.1 | Absent | Palmitic | 1.5 | DDA70 |
| A8 | Vulkanox ® BKF | 0.2 | Present | Palmitic | 1.5 | HVA2 |
| A9 | Vulkanox ®BKF | 0.5 | Present | Stearic | 1 | DDA70 |
| A10 | Vulkanox ®BKF | 0.5 | Absent | Stearic | 0.5 | DDA70 |
| B11 | Vulkanox ® KB | 0.1 | Present | Stearic | 1.5 | DDA70 |
| B12 | Vulkanox ® KB | 0.1 | Absent | Palmitic | 1 | DDA70 |
| B13 | Vulkanox ® KB | 0.2 | Absent | Stearic | 1 | HVA2 |
| B14 | Vulkanox ® KB | 0.5 | Present | Palmitic | 1.5 | HVA2 |
| B15 | Vulkanox ® KB | 0.5 | Absent | Palmitic | 0.5 | DDA70 |
| B16 | Vulkanox ® BKF | 0.1 | Present | Palmitic | 0.5 | HVA2 |
| B17 | Vulkanox ® BKF | 0.1 | Absent | Stearic | 1.5 | HVA2 |
| B18 | Vulkanox ® BKF | 0.2 | Present | Palmitic | 0.5 | DDA70 |
| B19 | Vulkanox ® BKF | 0.2 | Absent | Stearic | 1.5 | DDA70 |
| B20 | Vulkanox ® BKF | 0.5 | Present | Stearic | 1 | HVA2 |

To evaluate the mold contamination, injection molding experiments were carried out on a DESMA 962 injection molding machine (Klöckner Ferromatik, D). This allows mixtures to be evaluated qualitatively in their exudation and mold contamination properties.

For the present objective, visual evaluation of the vulcanized components is of importance. Critical points are the front and rear in the gate region of the mold, flow line points behind obstacles and the other side of the mold end.

The geometry of the mold is shown in FIG. 1. The mold contamination is evaluated at 4 points:

$R_t$=runner, top $R_b$=runner, bottom $MFL_t$=material flow line top $MFL_b$=material flow line, bottom The evaluation leads to a characteristic value of 0 (no contamination) to 4 (very severe mold contamination).

For this purpose, in each case 80 injection moldings are produced under the following parameters from the mixtures of examples 5 and 6 and the molds are then evaluated visually:

| Parameter: | |
|---|---|
| Mold temperature | 190° C. |
| Heating time | 90 sec |
| Extruder temperature | 60° C. |
| Barrel temperature | 60° C. |
| Injection pressure | 150 bar |
| Back pressure | 8 bar |
| Screw speed | 80% |
| Evacuation time | 10 sec |

The evaluation is shown in Table 4.

TABLE 4

| | Example 5 | Example 6 |
|---|---|---|
| $R_t$ | 0.5 | 4 |
| $R_b$ | 1 | 4 |
| $MFL_t$ | 1 | 4 |
| $MFL_b$ | 1.5 | 4 |

FIG. 2 shows the molds from example 5, FIG. 3 those from example 6.

A significantly lower mold contamination is seen in example 5 compared with example 6.

Examples NBR A to D

The mixtures listed in Table 5 were prepared, the recipe constituents in each case being stated per 100 parts of rubber.

TABLE 5

| Starting substances | Example A | Example B | Example C | Example D |
|---|---|---|---|---|
| NBR A | 100 | | | |
| NBR B | | 100 | | |
| NBR C | | | 100 | |
| NBR D | | | | 100 |
| Carbon black Corax N 500 | 30 | 30 | 30 | 30 |
| Carbon black Carbot N 772 | 50 | 50 | 50 | 50 |
| Vulkanol ® HS | 1.5 | 1.5 | 1.5 | 1.5 |
| Vulkanox ® MB2 | 1.5 | 1.5 | 1.5 | 1.5 |
| Vulkanol ® OT | 10 | 10 | 10 | 10 |
| Stearic acid | 0.3 | 0.3 | 0.3 | 0.3 |
| Zinc oxide, active | 5 | 5 | 5 | 5 |
| Rhenocure ® IS60/G75 (sulfur) | 0.35 | 0.35 | 0.35 | 0.35 |
| Vulkacit ® NZ/EG | 1.5 | 1.5 | 1.5 | 1.5 |
| Vulkacit ® Thiuram C | 1.5 | 1.5 | 1.5 | 1.5 |
| Vulkalent ® EC | 1 | 1 | 1 | 1 |

The mixtures were prepared in a laboratory kneader GK 90 E (Krupp Elastomertechnik, Hamburg), cooling water temperature 50° C., blade speed 50 RPM, plunger pressure 6 bar, kneader filling level 70 to 80%, based on the chamber volume of the kneader.

Mixing sequence: Initially introduce the rubber, add the remaining constituents after a running time of 0.5 min, emptying of the kneader after a mixing time of 3 min.

The sheets for the determination of the mechanical properties were crosslinked/vulcanized in a vulcanizing press (Krupp Elastomertechnik) at 160° C. to t 90+5 minutes. The results of the physical tests are shown in Table 6.

TABLE 6

| | Example A | Example B | Example C | Example D |
|---|---|---|---|---|
| S in MPa | 15.9 | 16.3 | 23.1 | 22.2 |
| E in % | 428 | 423 | 417 | 434 |
| M 100 in MPa | 3.4 | 3.9 | 4.6 | 4.3 |
| M 200 in MPa | 8.2 | 9.3 | 12.8 | 11.6 |
| M 300 in MPa | 12.7 | 13.7 | 19 | 17.6 |
| H 23° C. as Shore A | 70 | 69 | 72 | 71 |
| Rebound elasticity in % (23 degrees C.) | 30.5 | 32 | 27.8 | 28.4 |

Mold Contamination and Exudation Experiments

Exudation is to be understood below as meaning the migration of an incompatible mixture constituent when this mixture is subjected to high shear forces such as are typical of the injection molding process.

Exudation is observed at any point in time of the injection molding process, i.e. it is independent of the number of cycles.

Mold contamination relates to the deposition of non-compatible mixture constituents on the mold surface. The extent of the mold contamination depends on the number of cycles.

The two phenomena are linked to one another and can be attributed to mixture constituents which, under typical process conditions, such as high temperatures and shear forces, have only low compatibility with the base polymer, such as e.g. residues of the emulsifier used during the polymerization or salts thereof.

The visual evaluation of the tendency towards exudation is carried out by injection molding experiments in which a mold according to Benfer and Wenig (Gummi, Asbest, Kuststoffe 45, No. 4, April 1983, page 161) which, because of its design in the gate region (1), leads to high shear forces and therefore also to a forcing of demixing, i.e. to mold contamination (DESMA 962 injection molding machine from Kloeckner Ferromatik) is used. The qualitative evaluation is carried out at the gate (1) and at the crosspieces and at the flow line of the vulcanization product (2+3) (see FIG. 1).

TABLE 7

Correlation between RPA sheets and DESMA test

|  | NBR example A | NBR example B | NBR example C | NBR example D |
|---|---|---|---|---|
| Evaluation gate 1 | 0.1 | 2 | 0.5 | 2 |
| Evaluation flow line 2 + 3 | 0.25 | 0.75 | 0.75 | 0.75 |

It can be seen from the data that mixtures which are based on NBR polymers with a low content of residual emulsifier have a lower tendency towards mold contamination, in particular in the gate region (point 1).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for reducing mold contamination in the injection molding process of a nitrile rubber, comprising the step of injecting a mixture comprising one or more nitrile rubbers and in the range of from 0.1–0.5 wt. % of a fatty acid(s) and optionally further additives and/or fillers into a mold.

2. Process according to claim 1, wherein the nitrile rubber(s) is/are chosen from the group consisting of NBR, partly hydrogenated NBR, completely hydrogenated NBR and mixtures of two or more of the group members.

3. Process according claim 1, wherein the fatty acid is a straight-chain fatty acid.

4. Process according to claim 1, wherein the fatty acid is a fatty acid having 16 or 18 carbon atoms or a mixture of these.

5. Process according claim 1, wherein the mixture further comprises a sillcatic filler, carbon black, zinc oxide, magnesium oxide or a mixture of two or more of these components.

6. Process according to claim 1, wherein the mixture comprises vulcanization retardants and/or vulcanization accelerators.

7. Process for preparing a shaped article comprising the step of reducing mold contamination in the injection molding process of a nitrile rubber, by employing a mixture comprising or more nitrile rubbers and in the range of from 0.1–0.5 wt. % of a fatty acid(s) and optionally further additives and/or fillers.

* * * * *